United States Patent
Kim et al.

(10) Patent No.: US 10,356,821 B2
(45) Date of Patent: Jul. 16, 2019

(54) METHOD AND APPARATUS FOR PERFORMING RANDOM ACCESS IN A MOBILE COMMUNICATION SYSTEM

(71) Applicant: Samsung Electronics Co., Ltd., Gyeonggi-do (KR)

(72) Inventors: Woo-Seong Kim, Gyeonggi-do (KR); Soeng-Hun Kim, Gyeonggi-do (KR); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/879,020

(22) Filed: Oct. 8, 2015

(65) Prior Publication Data
US 2016/0037562 A1 Feb. 4, 2016

Related U.S. Application Data

(63) Continuation of application No. 14/609,266, filed on Jan. 29, 2015.

(30) Foreign Application Priority Data

Jan. 29, 2014 (KR) .................. 10-2014-0011267

(51) Int. Cl.
*H04W 74/08* (2009.01)
*H04W 56/00* (2009.01)
(Continued)

(52) U.S. Cl.
CPC .......... *H04W 74/0833* (2013.01); *H04L 5/00* (2013.01); *H04W 36/0005* (2013.01);
(Continued)

(58) Field of Classification Search
CPC ......... H04W 74/0833; H04W 36/0077; H04W 36/08; H04W 56/001; H04W 74/006;
(Continued)

(56) References Cited

U.S. PATENT DOCUMENTS 8,917,664 B2 12/2014 Jang et al.
2012/0314566 A1 12/2012 Lee et al.
(Continued)

FOREIGN PATENT DOCUMENTS

| CN | 105814957 A | 7/2016 |
| KR | 10-2013-0125721 | 11/2013 |
| WO | 2015087544 A1 | 6/2015 |

OTHER PUBLICATIONS

3GPP TSG RAN WG2 #83bis; "Random Access Procedure for Small Cell Enhancements"; R2-133359; Ljubljana, Slovenia; Oct. 7-11, 2013; 3 pages.
(Continued)

*Primary Examiner* — Jae Y Lee
*Assistant Examiner* — Aixa A Guadalupe Cruz

(57) ABSTRACT

The present disclosure relates to a method and apparatus for performing random access in a user equipment for a small cell e-NB with a small cell service area in heterogeneous e-NB cell carrier integration (dual connectivity or inter-eNB carrier aggregation) in mobile communication systems. In accordance with an aspect of the present disclosure, a method for performing random access in a mobile communication system is provided. The method includes receiving a configuration request message for configuring a Serving Cell Group (SCG) from a second eNB located in a service area of a first eNB through the first eNB; configuring an SCG cell based on the configuration request message, and sending a configuration response message in response to the configuration request message to the second eNB through the first eNB; and performing random access if there is uplink data present on a logic channel (LCH) relocated into the SCG cell.

15 Claims, 11 Drawing Sheets

(51) Int. Cl.
  *H04L 5/00*   (2006.01)
  *H04W 36/00*  (2009.01)
  *H04W 74/00*  (2009.01)
  *H04W 36/08*  (2009.01)
  *H04W 84/04*  (2009.01)

(52) U.S. Cl.
  CPC ....... *H04W 56/001* (2013.01); *H04W 74/006* (2013.01); *H04W 36/0077* (2013.01); *H04W 36/08* (2013.01); *H04W 84/045* (2013.01)

(58) Field of Classification Search
  CPC ... H04W 36/00; H04W 76/025; H04W 92/20; H04L 5/00; H04L 5/0048
  See application file for complete search history.

(56) References Cited

U.S. PATENT DOCUMENTS

| | | | |
|---|---|---|---|
| 2013/0188612 A1* | 7/2013 | Dinan | H04W 56/0005 370/336 |
| 2015/0099501 A1 | 4/2015 | Kim et al. | |
| 2015/0173047 A1* | 6/2015 | Yamada | H04W 72/042 370/329 |
| 2015/0173120 A1* | 6/2015 | Yamada | H04W 36/0072 370/331 |
| 2015/0245402 A1 | 8/2015 | Mochizuki | |

OTHER PUBLICATIONS

3GPP TSG RAN WG2 #84; "LS on Random Access in Dual Connectivity"; R2-134603; San Francisco, USA; Nov. 11-15, 2013; 1 page.
3GPP TSG RAN WG2 #84; "BSR and SR for Dual Connectivity"; R2-133855; San Francisco, USA; Nov. 11-15, 2013; 5 pages.
3GPP TSG RAN WG2 #83bis; "Random Access on SCell in inter-ENB CA"; R2-133269; Ljubljana, Slovenia; Oct. 7-11, 2013; 3 pages.
International Search Report dated Apr. 20, 2015 in connection with International Patent Application No. PCT/KR2015/000988, 3 pages.
Written Opinion of International Searching Authority dated Apr. 20, 2015 in connection with International Patent Application No. PCT/KR2015/000988, 6 pages.
Extended European Search Report for European Application No. 15743751.8, dated Sep. 13, 2017. (12 pages).
3GPP TSG RAN WG2 #83bis; Ericsson, "Random Access for dual connectivity"; R2-133431; Ljubljana, Solvenia, Oct. 7-11, 2013. (2 pages).
3GPP TSG RAN WG2 #84; Interdigital Communications, "Scheduling Aspects of MAC with Dual Connectivity"; R2-134400; San Francisco, USA, Nov. 11-15, 2013. (3 pages).
3GPP TSG RAN WG3#82; Catt, "Overall Signaling flow over S1/Xn for 3C"; R3-132037; San Francisco, CA, USA, Nov. 11-15, 2013. (7 pages).
Office Action dated Sep. 29, 2018 in connection with Chinese Patent Application No. 201580006580.8, 21 pages.

* cited by examiner

METHOD AND APPARATUS FOR PERFORMING RANDOM ACCESS IN A MOBILE COMMUNICATION SYSTEM

PRIORITY

This application is a continuation of U.S. patent application Ser. No. 14/609,266 filed on Jan. 29, 2015, which claims priority under 35 U.S.C. § 119(a) to a Korean Patent Application filed in the Korean Intellectual Property Office on Jan. 29, 2014 and assigned Serial No. 10-2014-0011267, the entire disclosure of which is incorporated herein by reference.

TECHNICAL FIELD

The present disclosure relates to a method and apparatus for performing random access in a user equipment for a small cell e-NB with a small cell service area in heterogeneous e-NB cell carrier integration (dual connectivity or inter-eNB carrier aggregation) in mobile communication systems.

BACKGROUND

In general, mobile communication systems have been developed to allow the user to communicate while moving around. The mobile communication system, fueled by rapid development of technologies, has reached a stage of providing high-speed data communication services as well as voice communication. In recent years, as one of next generation mobile communication systems, Long Term Evolution-Advanced (LTE-A) is being standardized by the 3rd Generation Partnership Project (3GPP). LTE-A is a technology to integrate cells with different frequencies supported in an e-NB to implement high-speed packet based communication that has higher transmission rate than a data rate currently provided, i.e., a carrier aggregation technology. As the 3GPP standard evolves, a small cell e-NB for supporting a cell with a small service area in the mobile communication system has often been used to expand capacity and eliminate shadow areas. The Release 12 (Rel-12) of the communication standard proposes a standard for providing high-speed communication services by integrating a cell of the small cell e-NB and a cell of the existing large cell e-NB, i.e., dual connectivity or inter-eNB carrier aggregation. Unlike the carrier aggregation provided by integrating a plurality of cells in a single e-NB as provided by LTE-A, high-speed uplink/downlink data services may be provided for terminals by integrating a plurality of cell carriers of heterogeneous e-NBs, according to the Rel-12.

The double connection has connectivity to two different e-NBs at the same time unlike the existing Rel-10 carrier aggregation, and may thus have the respective independent Physical Uplink Control Channels (PUCCHs). In the existing Rel-10 carrier aggregation, to send control information such as Channel Quality Indicator (CQI) or a response to data received at the UE (e.g., acknowledgment ACK/NACK), a control channel of a primary cell (PCell) is shared by secondary cells (SCells). Accordingly, it has a structure in which ACK for downlink data of the carrier aggregated SCells is delivered on an uplink control channel of the PCell. As for a random access channel, in the existing carrier aggregation, since the PCell and the Scell are serving cells included in the same e-NB, they may use the same uplink timing that the UE has. Accordingly, separate random access procedures for the SCell does not need to be performed.

However, as for carrier aggregation for a distant small cell using the Remote Radio Head (RRH) as proposed by the Rel-11, it may follow the existing carrier aggregation scheme in which a small cell and a macro cell are included in the same e-NB, but requires separate random access because the distances from the UE to the macro serving cell and the distant small cell are different. In this regard, in the LTE Rel-11 standard, UE is instructed to configure a Timing Advance Group (TAG) based on the uplink timing for a serving cell and to control the uplink timing with Medium Access Control (MAC) control elements (CEs) for each TAG. Likewise, even in carrier aggregation between heterogeneous e-NBs in the Rel-12, a small cell and a macro cell are likely to have different uplink timing. However, since the small cell e-NB may have an uplink control channel in the carrier aggregation between heterogeneous e-NBs, the UE may control the uplink timing for serving cells of the small cell e-NB through a direct random access procedure. Therefore, definition for a random access procedure for a serving cell of a small cell e-NB in a mobile communication system is required.

SUMMARY

The present disclosure provides a method and apparatus for performing random access for a serving cell (or a Secondary Cell Group (SCG)) of a small cell eNB.

In accordance with an aspect of the present disclosure, a method for performing random access in a mobile communication system is provided. The method includes receiving a configuration request message for configuring a Serving Cell Group (SCG) from a second eNB located in a service area of a first eNB through the first eNB; configuring an SCG cell based on the configuration request message, and sending a configuration response message in response to the configuration request message to the second eNB through the first eNB; and performing random access if there is uplink data present on a logic channel (LCH) relocated into the SCG cell.

In accordance with another aspect of the present disclosure, a method for performing random access in a mobile communication system is provided. The method includes receiving a Serving Cell Group (SCG) addition request message from a first eNB at a second eNB located in a service area of the first eNB; sending a configuration request message to a UE through the first eNB in response to the SCG addition request message; and receiving a configuration response message through the first eNB in return for the configuration request message, and performing random access with the UE.

In accordance with another aspect of the present disclosure, an apparatus for performing random access in a mobile communication system is provided. The apparatus includes a receiver for receiving a configuration request message for configuring a Serving Cell Group (SCG) from a second eNB located in a service area of a first eNB through the first eNB; a controller for configuring an SCG cell based on the configuration request message, controlling a configuration response message in response to the configuration request message to be sent to the second eNB through the first eNB, and performing random access if there is uplink data present on a logic channel (LCH) relocated into the SCG cell; and a transmitter for sending the configuration response message under control of the controller.

In accordance with another aspect of the present disclosure, an apparatus for performing random access in a mobile communication system is provided. The apparatus includes a receiver for receiving a Serving Cell Goup (SCG) addition request message from a first eNB at a second eNB located in a service area of the first eNB; a transmitter for sending a configuration request message to a UE through the first eNB in response to the SCG addition request message; and a controller for performing random access with the UE if a configuration response message through the first eNB is received by the receiver in return for the configuration request message.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other features and advantages of the present disclosure will become more apparent by describing in detail exemplary embodiments thereof with reference to the attached drawings in which.

Throughout the drawings, like reference numerals will be understood to refer to like parts, components, and structures.

DETAILED DESCRIPTION

Figure 1:
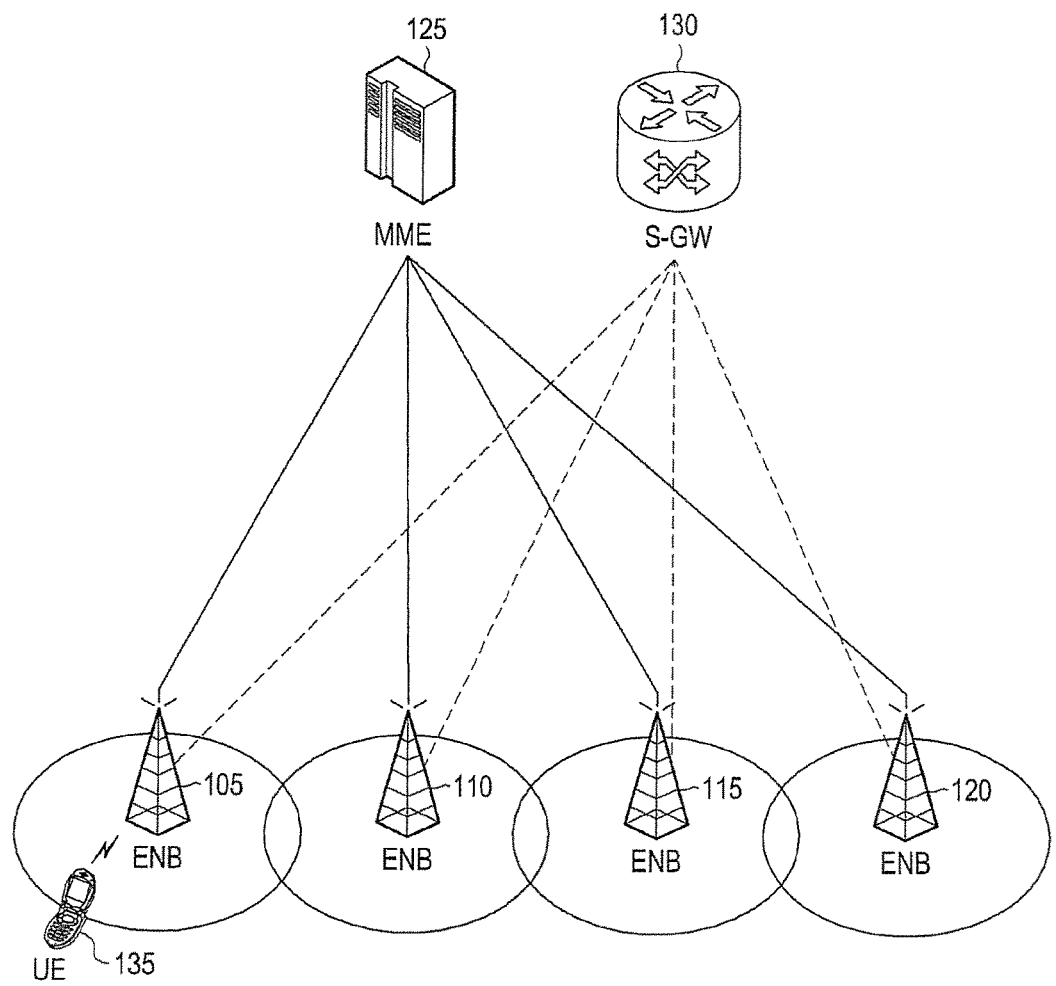
FIG. 1 is a schematic diagram illustrating a mobile communication system, according to an embodiment of the present disclosure.

Reference will now be made in detail to embodiments, examples of which are illustrated in the accompanying drawings, wherein like reference numerals refer to the like elements throughout. Descriptions of some well-known technologies that possibly obscure the invention will be omitted, if necessary.

Problems to be solved will be first described in connection with embodiments of the present disclosure, and then a method and apparatus for performing random access in a mobile communication system will be described in accordance with embodiments of the present disclosure.

In the technology of carrier aggregation between heterogeneous eNBs of the Rel-12, random access for a serving cell group or a Secondary Cell Group (SCG) of a small cell eNB may be performed, so a need exists to define the procedure. In the existing random access technology, when uplink transmission is attempted in handover to send a Radio Resource Control (RRC) connection reconfiguration complete (rrcConnectionReconfigurationComplete) message, random access is initiated in a target cell by triggering a regular Buffer Status Report (BSR). In other words, since the UE has no uplink sync information for the target cell, a random access procedure is required to send the handover message to the eNB.

In the Rel-12 inter-eNB carrier aggregation, when a macro eNB is reported of measurement information of surrounding small cells from a terminal to add a serving cell of a small cell eNB for the first time, the macro eNB performs a cell addition procedure by selecting a small cell based on the report. In the Rel-12 inter-eNB carrier aggregation or double connection, the RRC functionality of the UE is operated only in the macro eNB. An RRC message of the UE is thus sent to the macro eNB, and configuration of the small cell eNB is sent using an Xn or X2 interface between the macro eNB and the small cell eNB. Thus, since the rrcConnecitonReconfigurationComplete message is sent through a Master Cell Group (MCG) of the macro eNB rather than the small cell eNB if an SCG cell is added, it is impossible to trigger random access for the SCG by means of the RRC control message. Sending some part of the control message to the MCG and some other part to the SCG may significantly increase complexity, so the RRC message is only sent to the macro eNB. Accordingly, in order to perform a random access procedure for uplink timing synchronization to the target eNB, i.e., the small cell eNB as in the existing handover procedure, a different procedure rather than the existing RRC message is needed. Furthermore, since the RRC functionality of the UE is in the macro eNB (MeNB), if SCG resource reconfiguration, e.g., addition and reconfiguration of a primary SCell (pSCell, a special cell among SCG cells), reconfiguration of PUCCH uplink control channel, or reconfiguration of security is required, the small cell eNB (SeNB) sends the rrcConnectionReconfiguration message to the UE through the MeNB. However, due to transmission delay between the two eNBs, when to reconfigure the radio connection and when to initiate the configuration is unpredictable. If the UE and the SeNB hold different radio resource configurations, failure in communication may occur. Thus, a scheme to synchronize RRC configurations of the UE and SeNB through random access in the SCG is needed.

To solve the problem, a method and apparatus for performing random access in a mobile communication system in accordance with embodiments of the present disclosure will now be described in detail.

FIG. 1 is a schematic diagram illustrating a mobile communication system, according to an embodiment of the present disclosure. A Long Term Evolution (LTE) system is shown in FIG. 1, for example.

Referring to FIG. 1, a radio access network of the LTE system includes evolved Node Bs (hereinafter, also referred to as ENBs, Node Bs, or Base Stations (BSs)) 105, 110, 115, 120, a Mobility Management Entity (MME) 125, and a Serving Gateway (S-GW) 130. A UE or terminal 135 access an external network via the ENB 105, 110, 115, 120 and the S-GW 130. ENBs 105, 110, 115, 120 of FIG. 1 corresponds to an existing Node B of a Universal Mobile Telecommunications System (UMTS) system. The ENB is connected to the UE 135 via a wireless channel, and plays a more sophisticated role than the existing node B does. In the LTE system, all user traffic including real-time services, such as Voice over IP (VoIP) services according to an Internet Protocol is served on a shared channel, so a device to collect status information, such as buffer status of UEs, available transmission power status, channel status, etc., and schedule the resources is required, and the ENB 105, 110, 115, 120 serves as the device. A single ENB may typically control a number of cells. To achieve 100 Mbps of transmission speed, the LTE system uses Orthogonal Frequency Division Multiplexing (OFDM) in the bandwidth of 20 MHz for a radio access technology. It also employs an Adaptive Modulation & Coding (AMC) scheme that determines a modulation scheme and channel coding rate based on the channel status of the UE. The S-GW 130 is a device to provide a data bearer, producing or eliminating the data bearer under control of the MME 125. The MME 125 is a device responsible for various control operations as well as mobility management functionality for the UE, and connected to a number of eNBs.

Figure 2:
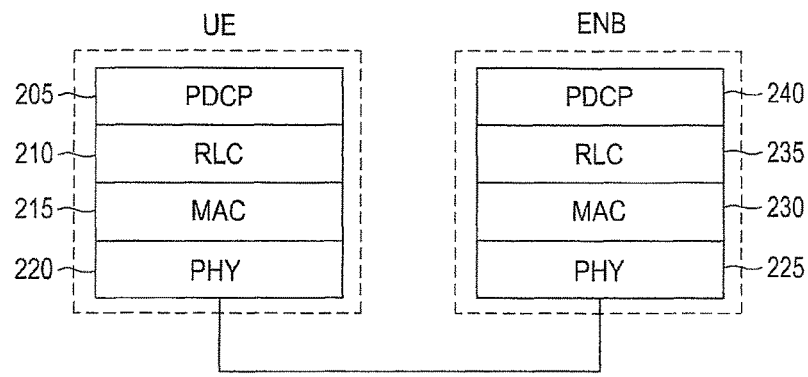
FIG. 2 shows a radio protocol architecture in a mobile communication system, according to an embodiment of the present disclosure.

FIG. 2 shows a radio protocol architecture in a mobile communication system, according to an embodiment of the present disclosure.

Referring to FIG. 2, the radio protocol of a mobile communication system includes Packet Data Convergence Protocol (PDCP) 205, 240, Radio Link Control (RLC) 210, 235, and Medium Access Control (MAC) 215, 230 in each of the UE and ENB. The PDCP 205, 240 is in charge of operations like IP header compression/restoration, and the RLC 210 is in charge of reconfiguring a PDCP Packet Data Unit (PDU) into a suitable size and performing e.g., Automatic Repeat reQuest (ARQ) operation. The MAC 215, 230 is connected to a number of RLC layer devices configured in a single UE, for multiplexing RLC PDUs to a MAC PDU and dimultiplexing RLC PDUs from a MAC PDU. Physical layer (PHY) 220, 225 performs channel coding and modulation on upper layer data, forms the data into OFDM symbols and sends them on a radio channel, demodulates OFDM symbols received on a radio channel, performs channel decoding and sends the result to an upper layer.

Figure 3:
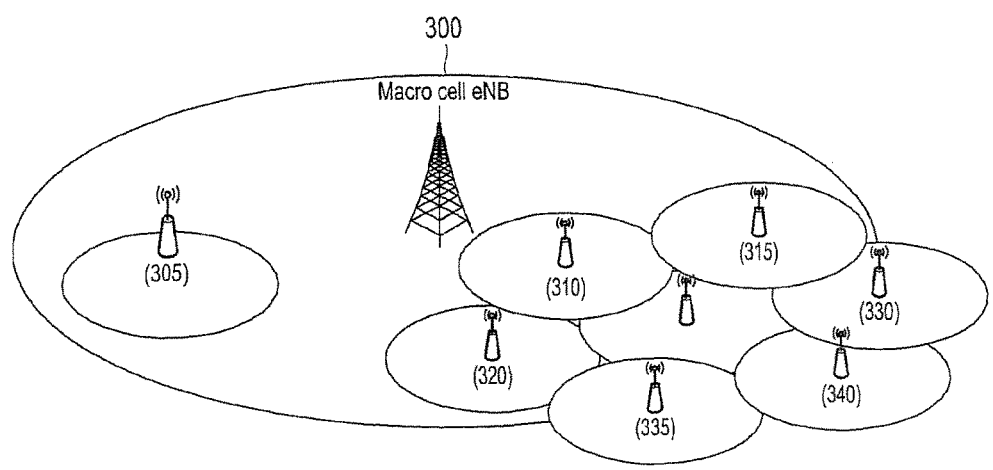
FIG. 3 shows deployment of small cell eNBs in a mobile communication system, according to an embodiment of the present disclosure.

FIG. 3 shows deployment of small cell eNBs in a mobile communication system, according to an embodiment of the present disclosure.

Referring to FIG. 3, a strategy for deploying a small cell eNB 305 is to sparsely deploy the small cell eNB 305 within a service area of a macro cell eNB 300. Such deployment is useful in covering a hot spot area where a lot of traffic occurs intensively, or a service shadow area. The small cell eNB 305 may use a frequency band the same as or different from that of the macro cell eNB 300.

Another strategy for deploying the small cell eNB 305 is to densely deploy a plurality of small cell eNBs 310, 315, 320, . . . , 340 to be adjacent to each other. This may be applied when a lot of traffic occurs in a rather wide area. The small cell eNBs 310 to 340 may even be in the service area of the macro cell eNB 300, or may not be in the service area of the macro cell eNB 300 because the service area may be occupied only by the small cell eNBs 310-340. All the small cell eNBs 310-340 may use the same frequency band, or may use different frequency bands. The small cell eNBs 310-340 may be mainly used to offload the traffic of the macro cell eNB 300. Once the UE measures signals of the surrounding small cell eNBs 310-340 and informs the macro cell eNB 300 of the measurements, the macro cell eNB 300 determines whether to offload user data to any of the small cell eNB 310-340.

Figure 4:
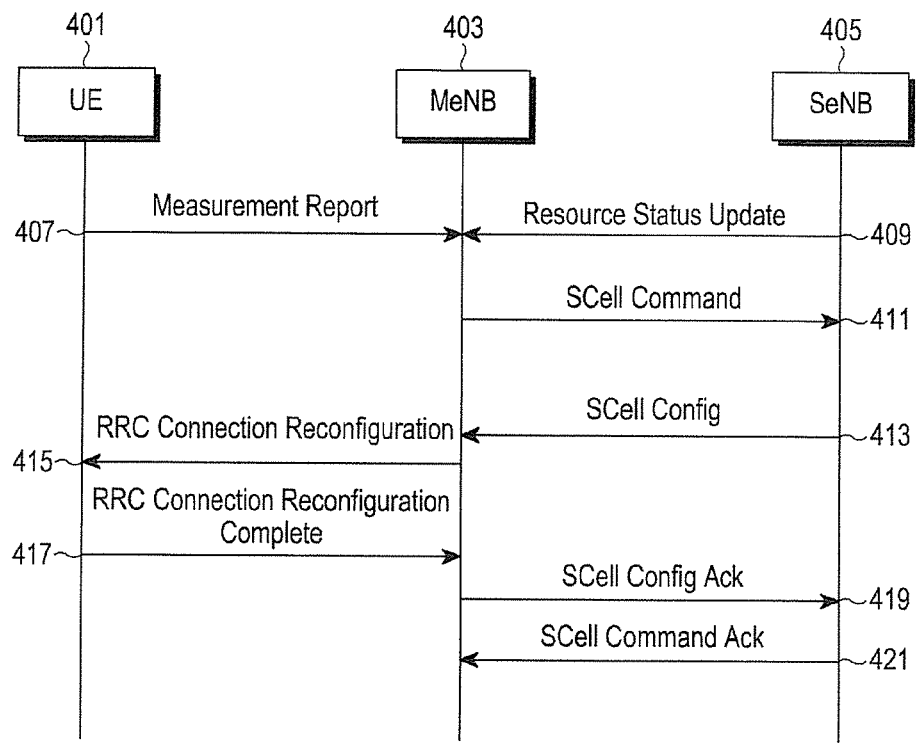
FIG. 4 is a message flowchart illustrating a procedure of offloading user data to a small cell eNB, according to an embodiment of the present disclosure.

FIG. 4 is a message flowchart illustrating a procedure to offload user data to a small cell eNB, according to an embodiment of the present disclosure. In this message flowchart, respective messages may use different names, but if some of them include similar information, they may be considered to be the same.

Referring to FIG. 4, a UE 401 measures signals of nearby small cell and macro cell, and reports a macro eNB (or called MeNB) 403 of the measurement results in a measurement report. The measurement report is a function performed by the UE, specified in the existing LTE standard, which is a procedure to report results of measuring neighboring signals under the rule defined by the eNB. With the measurement report procedure, the eNB may perform a handover procedure for the UE or properly schedule the eNB radio resources. This is defined as Radio Resource Management (RRM). Double connection may be made in a heterogeneous network in which a macro cell and small cells are mixed as shown in FIG. 1. Double connection refers to respective connection to different eNBs, and eNBs that corresponds to the double connection are the MeNB 403 and SeNB 405 of FIG. 4. In other words, the UE 401 may make concurrent connections to the MeNB 403 and SeNB 405. In the double connection situation, the MeNB 403 manages RRM of the UE. Accordingly, the UE 401 periodically reports the MeNB 403 of measurements of a nearby cell. Furthermore, the MeNB 403 is periodically reported from the SeNB 405 of information about resource usage status of the small cell eNB, e.g., an extent of Physical Resource Block (PRB) usage and transmission output, in a resource status update message, in operation 409. With the report, the MeNB 403 determines whether to use the SeNB 405 as an assisted cell. Once the MeNB 403 determines to add the SeNB 405 based on the information, it sends a SCellCommand message to the SeNB 405 through an X2 interface, in operation 411. The SCellCommand message includes what is about addition or release of a serving cell (SCell or secondary cell) belonging to the SeNB. Requested for addition or release, the SeNB 405 sends the MeNB 403 information about RRC reconfiguration in a SCellConfig message, in operation 413. The SCellConfig message includes information for RRC reconfiguration about addition or release of the serving cell of the SeNB. The SCellConfig message may be an RRC message defined in the existing LTE standard, or information for an RRC message to be created by the MeNB 403. If the SCellConfig message is the RRC message itself for the UE 401, the MeNB 403 simply forwards the message to the UE 401. Otherwise, the MeNB 403 creates an RRC reconfiguration message based on the SCellConfig message. Operations 415 to 417 represent a procedure to send the RRC reconfiguration message for newly adding or releasing a serving cell of the SeNB 405 and receive a response message. The message sending procedure conforms to the existing LTE standard. With the procedure, the UE 401 performs an access procedure or a release procedure for the SeNB 405 in operations 415 to 417. The SCellConfig message includes information about a specific serving cell able to perform PUCCH or Random Access Channel (RACH). The serving cell is called a primary Scell, pSCell, which is different from other serving cells (SCells) of the SeNB. Other SCells have no PUCCH or RACH, and ACK for downlink data is sent through the pSCell. Upon reception of the RRC message, the UE 401 performs a random access procedure to the pSCell to add the serving cell of the SeNB 405 for the first time, in operation 415. The random access procedure is a procedure for uplink synchronization and designation of an uplink transmission output for the serving cell of the SeNB 405, and a procedure to request initial uplink radio resources. The respective MeNB 403 and SeNB 405 then send ACK in response to the received message, in operations 419 and 421.

For offloading to a small cell in FIG. 4, the MeNB 403 needs signal strength values of surrounding serving cells measured by the UE 401 and small cell eNB status information sent from the SeNB 405, in operation 409, in order to add the serving cell of the SeNB 405. The two values are not relevant to each other, and the UE 401 has no information about the resource status update message.

Figure 5A:
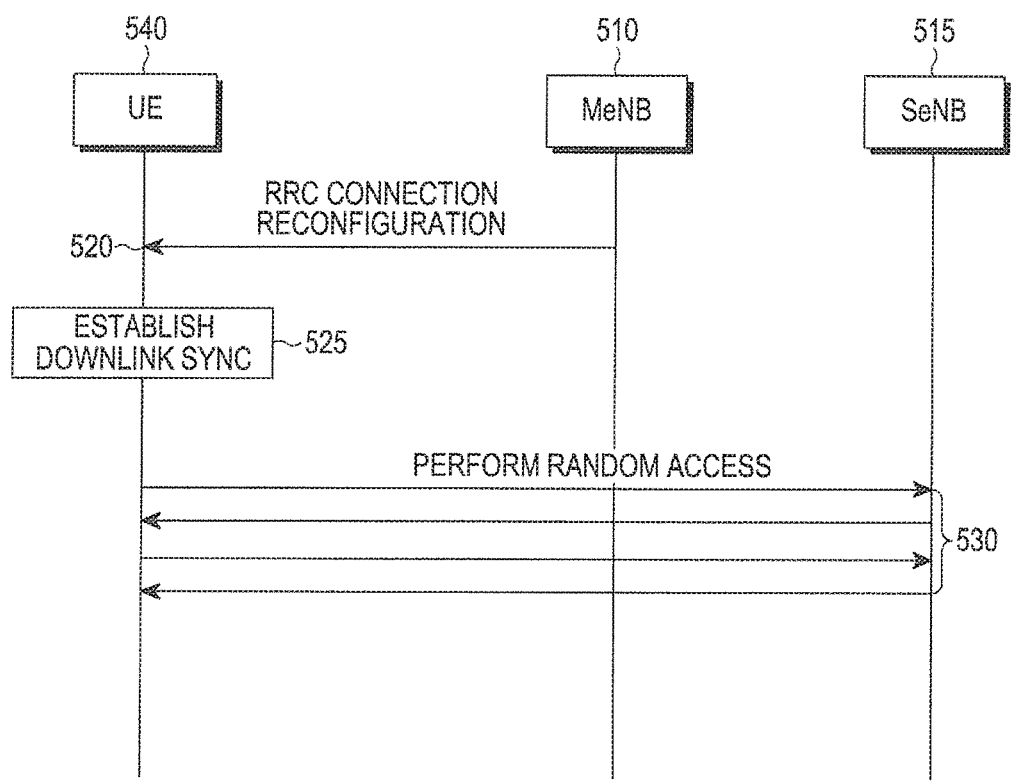
FIGS. 5A and 5B are message flowcharts of a random access procedure in a mobile communication system, according to an embodiment of the disclosure.
Figure 5B:
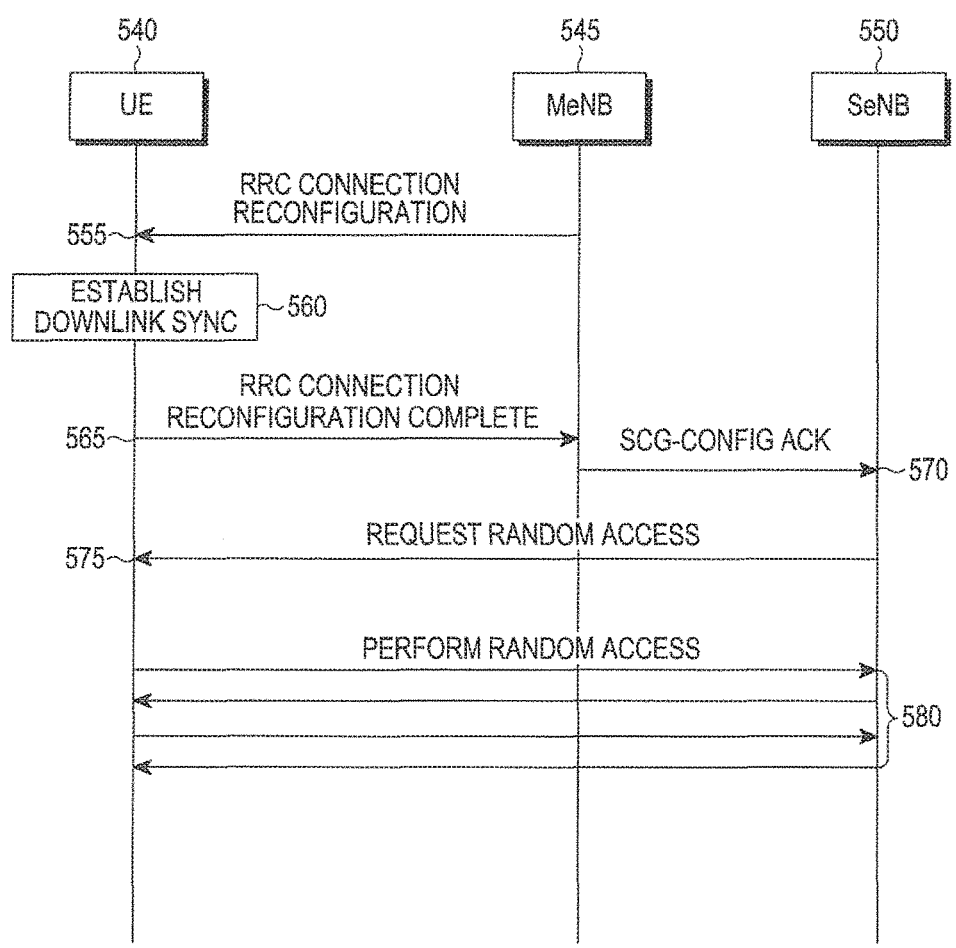

FIGS. 5A and 5B are message flowcharts of a random access procedure in a mobile communication system, according to an embodiment of the disclosure. FIG. 5A shows the MAC of a UE initiating a random access procedure in a pSCell of the SCG, and FIG. 5B shows an eNB requesting a random access procedure.

In the existing Rel-11 carrier aggregation, there is no procedure where the UE performs random access to an SCell as shown in FIG. 5A, but only a procedure where a request is sent to the UE in a dedicated preamble on the Physical Downlink Control Channel (PDCCH) to perform a random access procedure in a PCell or pSCell as shown in FIG. 5B. On the other hand, in the Rel-12 heterogeneous carrier aggregation or double connection, both procedures of FIGS. 5A and 5B may be performed for respective PCells of the MeNB and SeNB.

Referring to FIG. 5A, MeNB 510 sends an initial request for SCG configuration to UE 505 in the rrcConnectionReconfiguration message for addition of a pSCell, in operation 520. The UE 505 activates its radio transceiver based on the rrcConnectionReconfiguration message and synchronizes the system clock to a downlink sync signal for the pScell, in operation 525. As such, the UE 505 completes downlink sync configuration for the SCG of the SeNB 515. The UE 505 then performs a random access to the pSCell 515 on the RACH, in operation 530. In this regard, in contrast to Rel-10, contention based random access with a random preamble is possible. Alternatively, in a case the rrcConnectionReconfiguration received from the MeNB 510 includes a dedicated preamble delivered from the SeNB 515 of the SCG, non-contention based random access with the preamble is performed.

Referring to FIG. 5B, upon reception of the rrcConnectionReconfiguration message for addition of SeNB 550 of the SCG for the first time, UE 540 performs downlink signal synchronization to the SCG pSCell, in operation 560. After completing the downlink signal synchronization, the UE 540 sends a response message (rrcConnectionReconfigurationComplete message) to the RRC message to the MeNB 545, in operation 565. The MeNB 545 then sends the SeNB 550 ACK for reception of the rrcConnectionReconfigurationComplete message, in operation 570. The SeNB 550 recognizes that configuration of the UE is completed by RRC, and sends the UE a random access request on the PDCCH for establishment of uplink timing, in operation 575. After performing the random access procedure, the UE 540 secures uplink synchronization for the SCG.

The following Table 1 represents scenarios in which Random Access (RA) is required and schemes for requesting to perform random access in the existing carrier aggregation. In Table 1, to access a first network, MAC performs contention based random access that requests random access to the PCell in the idle state. A procedure to reconfigure RRC connection is also the same as a scheme required in the initial access procedure. As for handover, as a procedure to obtain uplink radio resources to send a handover complete message to a target eNB, non-contention based random access is performed with a dedicated preamble of the target eNB cell received through a source eNB. In a situation where data transmission is resumed after there has not been data transmission for a while in the connected state, the UE might lose uplink timing, so the eNB may send the UE a request on the downlink control channel for a random access procedure for the PCell or SCell for coordination of uplink timing before the eNB resumes downlink data transmission. In contrast, if the eNB is to send uplink data, it attempts random access at the MAC request. Lastly, PCell or SCell requests random access on the downlink channel for the positioning purpose while connected.

TABLE 1

| RA triggering events in 36.300 | PDCCH/MAC initiated | PCell/SCell |
|---|---|---|
| Initial access from RRC_IDLE | MAC initiated | PCell |
| RRC connection Re-establishment procedure | MAC initiated | PCell |
| Handover | MAC initiated | PCell |
| DL data arrival during RRC_CONNECTED | PDCCH initiated | PCell/SCell |
| UL data arrival during RRC_CONNECTED | MAC initiated | PCell |
| For positioning purpose during RRC_CONNECTED | PDCCH initiated | PCell/SCell |

Comparing the flows of pSCell random access upon request of the MAC layer and random access triggered by the small cell eNB, SeNB, as shown in FIGS. 5A and 5B, respectively, the random access procedure triggered by the MAC of the UE as shown in FIG. 5A is simpler. Accordingly, complexity of the procedure may be reduced by enabling random access in the SeNB pSCell.

The following Table 2 represents random access procedures and types that may occur in a situation of double connection or inter-eNB carrier aggregation in accordance with an embodiment of the present disclosure.

Similar to the existing carrier aggregation, contention based or non-contention based random access is possible in a pSCEll or SCell of SCG. Start of random access on the downlink control channel in MAC or eNB is all enabled in PCell in the existing carrier aggregation, and random access is enabled only on the downlink control channel in an SCell. In the Rel-12 double connection, random access may be initiated by both schemes as a PCell of an MCG for the pSCell, and random access may be initiated only by the downlink control channel as an SCell of the MCG for the SCell.

TABLE 2

|  | PCell | SCell in MCG | pSCell | SCell in SCG |
|---|---|---|---|---|
| Contention based or Contention free random access | Both | Both | Both | Both |
| MAC initiated random access or PDCCH initiated random access | Both | Only PDCCH initiated RA | Both | Only PDCCH initiated RA |
| Note | As per up to Rel-11 | As per Rel-11 |  | Aligned with Rel-11 principles |

The following Table 3 represents operations of the MAC layer for events that trigger the random access. The description is denoted in the LTE standard TS 36.300. First, when the UE is changed into a connected state from idle state, the rrcConnectionRequest message requesting an access to a network is sent from the upper RRC layer on the Common Control Channel (CCCH). This induces Regular Buffer Status Report (R-BSR), and triggers a random access procedure to send an R-BSR MAC CE. Secondly, when the UE has lost its radio connection temporarily, as a procedure to re-establish the connection, the rrcConnectionReestablishmentRequest message is sent on the CCCH, which immediately leads to triggering transmission of R-BSR to send the uplink message, and a random access procedure is performed to send the R-BSR MAC CE. In case of handover, to send an rrcConnectionReconfigurationComplete message to a target eNB, transmission of the R-BSR is requested, for which random access is triggered. In case of re-start of downlink transmission, since the eNB requests random access on the downlink control channel, triggering in the MAC layer of the UE is not necessary. In resuming uplink data transmission, B-BSR transmission is requested while uplink data occurs on DTCH or DCCH of the UE, which requests random access. Although not specified in the standard, an occasion where there is no response from the eNB even after Scheduling Requests (SRs) have been sent from the UE in connected state more than a number of times determined by the eNB is defined as SR failure, in which case the UE performs random access to re-establish the connection.

first SCG addition or reconfiguration of the current SCG cell.

First, for first SCG addition, MeNB 602 sends SeNB 603 a request message to add a corresponding SCG serving cell, in operation 605, as in operation 411 of FIG. 4. In response, the SeNB 603 sends an SCG-Config message to the MeNB 602, in operation 610. The MeNB 602 then sends UE 601 a request to additionally configure the SCG cell in the rrcConnectionReconfiguration message, in operation 620. Upon reception of the SCG-Config message from the SeNB 603, the MeNB 602 may exchange data and information about SN status with the SeNB 603, in operations 630, 640.

After that, upon reception of the rrcConnectionReconfiguration message, the UE 601 responds to the MeNB 602 with a rrcConnectionReconfigurationcomplete message. The MeNB 602 then sends the SeNB 603 ACK for reception of the rrcConnectionReconfigurationComplete message, in operation 660. Accordingly, the UE 601 performs a random access procedure with the SeNB 603, in operation 670.

Figure 6:
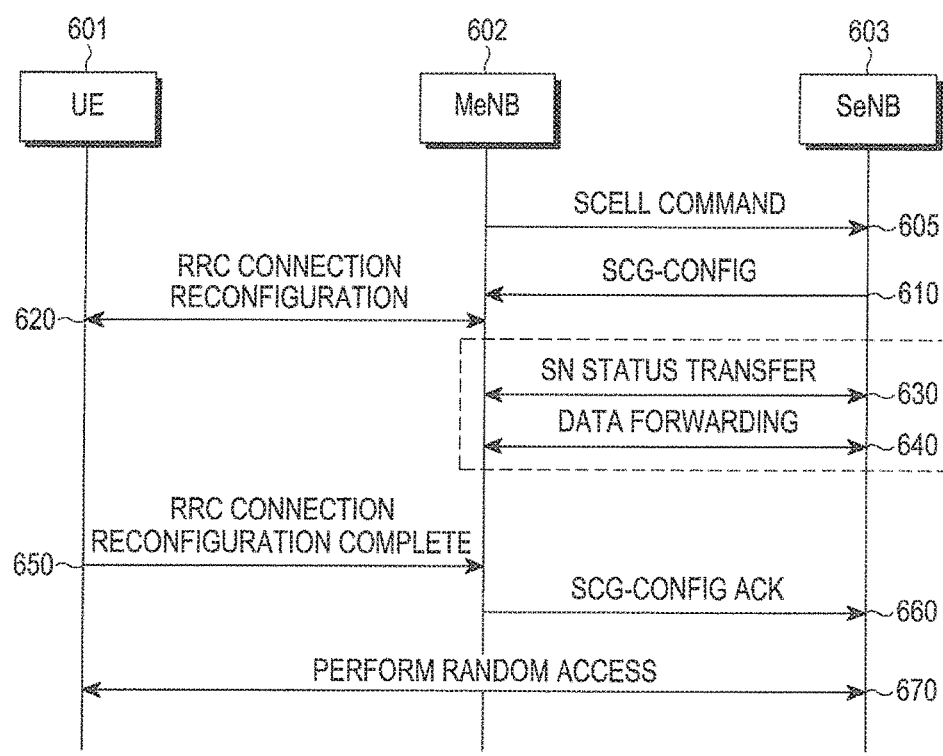
FIG. 6 is a message flowchart of a random access procedure in a mobile communication system, according to another embodiment of the disclosure.

In the meantime, since the rrcConnectionReconfigurationcomplete message is sent from the UE 601 to the MeNB 602, if the UE 601 has no uplink transmission data for the SeNB 603 since the message has been sent, a random access procedure is not triggered in operation 670. As represented in Table 3, since the rrcConnectionReconfiguration message is sent to the SeNB 603 in the general handover procedure, if the message is delivered on an uplink data channel (DTCH), the MAC layer creates R-BSR for the message and determines whether the SCG MAC secures uplink transmission sync to the eNB and whether there is a radio resource for uplink data transmission, to send the MAC CE to the SeNB. In an occasion of first access to the SCG as shown in FIG. 6, since uplink sync is not secured for the small cell eNB, random access needs to be performed. On the other hand, if, in FIG. 6, the rrcConnectionReconfiguration message has been sent to the MeNB and there is no data to be transmitted to the SeNB, a random access procedure is not performed. Accordingly, in FIG. 6, in a random access procedure in accordance with an embodiment of the present disclosure, SeNB sends the MeNB secondary mobility control information (sMCI), or MCI-SCG, or configuration information with a different name in the SCG-Config mes-

TABLE 3

| RA triggering events in 36.300 | PDCCH/MAC initiated | Triggering in 36.321 |
|---|---|---|
| Initial access from RRC_IDLE | MAC initiated | R-BSR for rrcConnectionRequest |
| RRC connection Re-establishment procedure | MAC initiated | R-BSR for rrcConnectionReestablishmentRequest |
| Handover | MAC initiated | R-BSR for rrcConnectionReconfigurationComplete |
| DL data arrival during RRC_CONNECTED | PDCCH initiated | Reception of PDCCH order |
| UL data arrival during RRC_CONNECTED | MAC initiated | R-BSR for DCCH/DTCH |
| For positioning purpose during RRC_CONNECTED | PDCCH initiated | Reception of PDCCH order |
| Not captured in 36.300 | MAC initiated | Upon D-SR failure |

FIG. 6 is a message flowchart of a random access procedure in a mobile communication system, according to another embodiment of the disclosure. In other words, FIG. 6 shows a random access procedure for simultaneously applying configuration of rrcConnectionReconfiguration in sage to be sent for SCG cell configuration. The information included in the SCG-Config message may include a preamble to be used by the UE 601 in a random access procedure 670 and radio resource (e.g., RACH) information for random access. With the preamble and radio resource for random access, non-contention based random access may be enabled, and otherwise, contention based random access is performed. Further, since random access resources are allocated by the SeNB, timer for the available time and configuration of the resources may be designated. For example, if it is designated that only 50 msec from the allocated time is available, the UE performs random access with the preamble and radio resources within 50 msec from when the UE receives an RRC message, and stops the timer when the random access is successful. If the SeNB 603 receives a preamble included in MCI-SCG or sMCI through the random access or successfully receives MAC CE for UE information (e.g., SCG C-RNTI) allocated by rrcConnectionReconfiguration that includes the sMCI from the UE in the random access procedure, it may recognize that the procedure of addition of the SCG serving cell has been successfully completed and the RRC configuration was successful in the UE. The message flowchart of FIG. 6 may be applied not only in the procedure to add the initial SCG serving cell for the first time but also in important configuration in need of RRC configuration sync between the UE and SeNB, such as reconfiguration of pSCell uplink control channel, pSCell change, security key change, etc. For example, even when the SeNB wants to change a current radio resource for the uplink control channel (PUCCH) of pSCell of the UE, the SeNB sends the MeNB a request to send the RRC message to the UE, the request including corresponding information, in the SCG-Config process 610 in accordance with the random access procedure of FIG. 6. In the process, however, since the SeNB 603 has no information about delay that occurs due to the UE adding the SCG serving cell in operations 610 to 660, the random access process 670 is essentially required. In other words, if the UE has not yet completed a process of initializing the RF transceiver even though it received a response message in operation 660 for the RRC reconfiguration request of the SeNB, sending a control message (DCI) on the downlink control channel is not necessary and the chances are high that the UE may not receive the message. Furthermore, even though numerous random access procedures may occur in the connection process where the UE and SeNB exchange data, it is impossible for the eNB to tell them from random accesses for uplink data transmission or timing sync. Accordingly, if the UE sent the SeNB a particular preamble included in sMCI as proposed in the present disclosure in the random access process 670, the SeNB may be aware that the uplink control channel reconfiguration requested in the SCG-Config process 610 was safely completed in the UE, and change the uplink channel configuration of the corresponding small cell. Random access request with the sMCI may be divided largely into two: a process of triggering random access in the process of initially adding an SCG cell, and a process of triggering random access for configuration sync in response to RRC reconfiguration of the SeNB. The two occasions may further be divided based on whether the dedicated preamble is included. In the random access for RRC configuration sync, delay occurs when the eNB receives a preamble and re-establish radio resources that it actually indicates to the UE. This may depend on implementations of the SeNB, but roughly, tens of miliseconds of delay may occur. Therefore, if the RRC configuration begins when the UE has successfully completed the random access, i.e., when it received Message 2 (a random access response), there is inconsistency in configuration between the UE and the SeNB for a while. Accordingly, the SeNB may set a timer to indicate the UE to start the RRC configuration after the random access in the RRC message. For example, if the SeNB sends information about a 20 msec timer in the RRC message, the UE receives Message 2 and starts the 20 msec timer; the eNB performs RRC reconfiguration within the corresponding time; and the UE and SeNB begin the respective configuration to be in sync with each other.

The following Table 4 is an example of triggering conditions of random access in the SCG defined in the mobile communication system in accordance with the present disclosure. PCell and MCG PCell conform to the existing LTE standard, so the detailed description will be omitted herein.

TABLE 4

|  | PCell | pSCell (index = y) | MCG SCell (index = x) | SCG SCell (index = x) |
| --- | --- | --- | --- | --- |
| Initial access from RRC_IDLE | Yes | No | No | No |
| RRC connection Re-establishment procedure | Yes | No | No | No |
| Handover | Yes | No | No | No |
| DL data arrival during RRC_CONNECTED | Yes if PDCCH order is received from MCG and cell index is 0 | Yes if PDCCH order is received from SCG and cell index is preconfigured one | Yes if PDCCH order is received from MCG and cell index is x | Yes if PDCCH order is received from SCG and cell index is x |
| UL data arrival during RRC_CONNECTED | Yes if MCG R-BSR is triggered and SR on PUCCH is not configured in PCell | Yes if SCG R-BSR is triggered and [SR on PUCCH is not configured in pSCell or uplink timing is not established in pSCell] | No | No |

TABLE 4-continued

|  | PCell | pSCell (index = y) | MCG SCell (index = x) | SCG SCell (index = x) |
|---|---|---|---|---|
| For positioning purpose during RRC_CONNECTED | Yes if PDCCH order is received from MCG and cell index is 0 | Yes if PDCCH order is received from SCG and cell index is preconfigured one | Yes if PDCCH order is received from MCG and cell index is x | Yes if PDCCH order is received from SCG and cell index is x |
| SR failure | Yes if SR failure occurs at PCell | Yes if SR failure occurs at pSCell | No | No |

As for a pSCell of an SCG, there is no uplink message to be sent on the CCCH, such as rrcConnectionRequest or rrcConnectionReEstablishmentRequest sent from the upper RRC layer for requesting initial network connection or reconnection after disconnection. The reason is that the SCG does not manage mobility and connection status of UE in the double connection. It is because RRC exists only in a macro eNB. Thus, in Table 4, in case of the initial connection and reconnection, random access occurs in a PCell but not in a pSCell. For the same reason, in case of handover, random access occurs only in an MCG PCell. If downlink data transmission of SCG is resumed, the SeNB triggers random access on the downlink control channel. In this regard, an index for an SCell for random access needs to be set in advance. If uplink data is generated in the UE, R-BSR for SCG is generated, which immediately triggers random access. It is limited to an occasion where no uplink radio resource request (SR) for uplink data transmission is established or the uplink transmission timing is out of sync. In the double connection, respective R-BSRs of MCG and SCG may be distinctively defined. Considering independence in the double connection of the MAC, most MAC operations may be independently performed for respective cell groups. Accordingly, MCG R-BSR is triggered only by data of a logical channel (LCH) of MCG, and SCG R-BSR is triggered only by data of an SCG LCH. SCG R-BSR is defined to trigger random access in a pSCell, and once SCG is configured for the first time, SCG R-BSR is naturally triggered because an LCH to be relocated to the SCG and uplink data exist. On the other hand, if there are no data available for transmission on the LCH relocated, or if the SCG is configured first and the LCH is relocated next, SCG-BSR is not triggered.

As a solution for this, redefine R-BSR triggering conditions in the double connection.

First, linking whether to relocate the LCH to R-BSR triggering operates as follows. First, in case of relocation to an SCG LCH, if the newly relocated SCG LCH takes higher priority over an old SCG LCH already relocated, SCG-BSR is triggered regardless of whether data is present or not. In case of relocation to an MCG LCH, if a stored amount of data available for transmission on the relocated LCH is equal to or more than a threshold, MCG-BSR is triggered.

Secondly, R-BSR triggering with a default LCG operates as follows. First, if SCG (or pSCell) is newly configured and an SCG LCH is not established, the UE generates a default SCG LCG with a certain identifier, i.e., the default LCG is an empty set. Once the default SCG LCG is generated, the UE triggers SCG R-BSR.

Besides that, for positioning, the SeNB triggers random access on the downlink control channel. Lastly, if uplink radio resource allocation by means of SR of a pSCell is failed, a random access process is performed. As for SCG SCell, it is the same as the existing MCG SCell. If the default SCG LCG is generated and the LCH is relocated from MeNB to SeNB, but there is no uplink data on the LCH, SCG R-BSR is to be automatically triggered as proposed, or to be triggered when the UE sends an arbitrary dummy packet on the LCH. This gives an advantage of triggering random access without change of the existing LTE standard.

Figure 7:
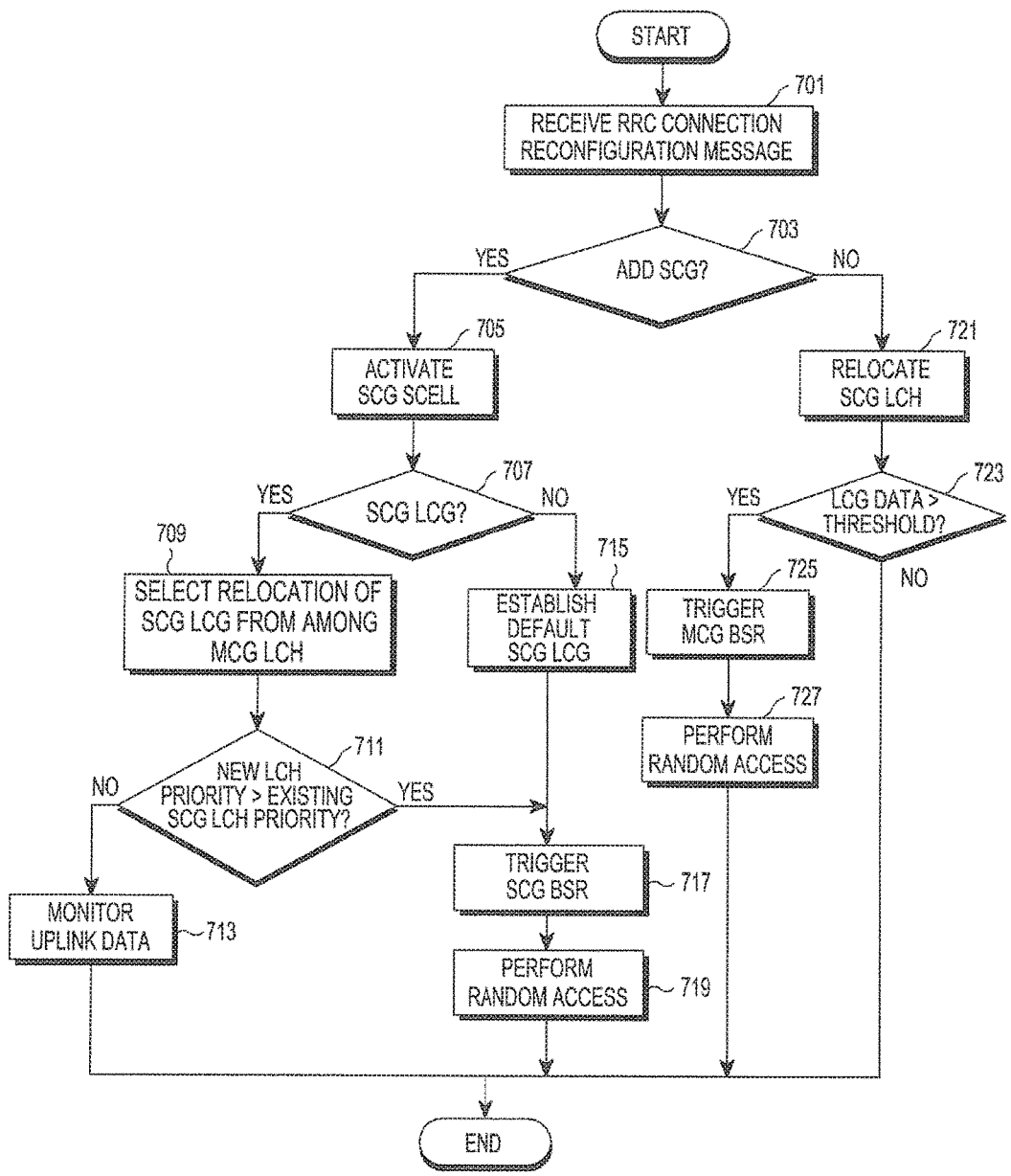
FIG. 7 is a flowchart illustrating a method for performing random access in UE of a mobile communication system, according to an embodiment of the present disclosure.

FIG. 7 is a flowchart illustrating a method for performing random access in UE of a mobile communication system, according to an embodiment of the present disclosure. This embodiment corresponds to the embodiment discussed with reference to FIG. 5A and Table 4.

Referring to FIG. 7, the UE receives an RRC configuration message, i.e., RRCconnectionReconfiguration message from a macro eNB, in operation 701. The UE then determines whether the received RRC configuration message is about SCG addition, in operation 703.

If the RRC configuration message is about the SCG addition, the UE activates the RF transceiver device for the serving cell, and performs establishment of the corresponding frequency and bandwidth, in operation 705. The UE then determines whether a Logical Channel Group (LCG) has been configured for the SCG, in operation 707. If the LCG has already been configured, the UE selects a bearer for offloading to the SCG from among MCG LCH, and performs an LCH relocation procedure for the selected bearer, in operation 709. The UE transfers the MCG LCH to the SCG for the bearer to be relocated to the SCG and establishes a new LCH, sets LCH priority of the bearer for offloading to the SCG, and compares priority between the LCH and the existing other SCG LCH, in operation 711. If the newly generated LCH takes higher priority over the existing SCG LCH, the UE triggers BSR for the SCG regardless of whether there is uplink data on the LCH, in operation 717. The UE then performs random access based on the BSR, in operation 719. Otherwise, if the newly generated LCH has equal or lower priority over the existing SCG LCH, the UE monitors uplink data, in operation 713.

In a case the UE adds a serving cell of the SCG for the first time, in operation 720, the UE establishes a default LCG because there is no LCG, in operation 715. In this regard, even if no data occurs for the default LCG, the UE triggers BSR for the SCG, in operation 717. This corresponds to the embodiment of the present disclosure as suggested in Table 4, which may solve the problem that random access is not performed in the initial configuration of SCG addition because no uplink data occurs. The UE performs random access using SCG BSR triggered in operation 870, in operation 719.

On the other hand, in a case that the received RRC message is not about the SCG addition, i.e., it is about a release, the UE stops LCH transmission/reception to the SCG and performs a procedure to release the corresponding data channel, in operation 721. That is, the UE performs a procedure to transform the SCG LCH for which transmission is stopped, to an MCG, in operation 721. After the MCG relocation of the LCH, the UE compares uplink data on the LCH and a certain threshold set by the eNB, in operation 723. If the uplink data on the LCH is higher than the threshold, the UE triggers MCG BSR, in operation 725. The UE then performs random access for the MCG, in operation 727.

Figure 8:
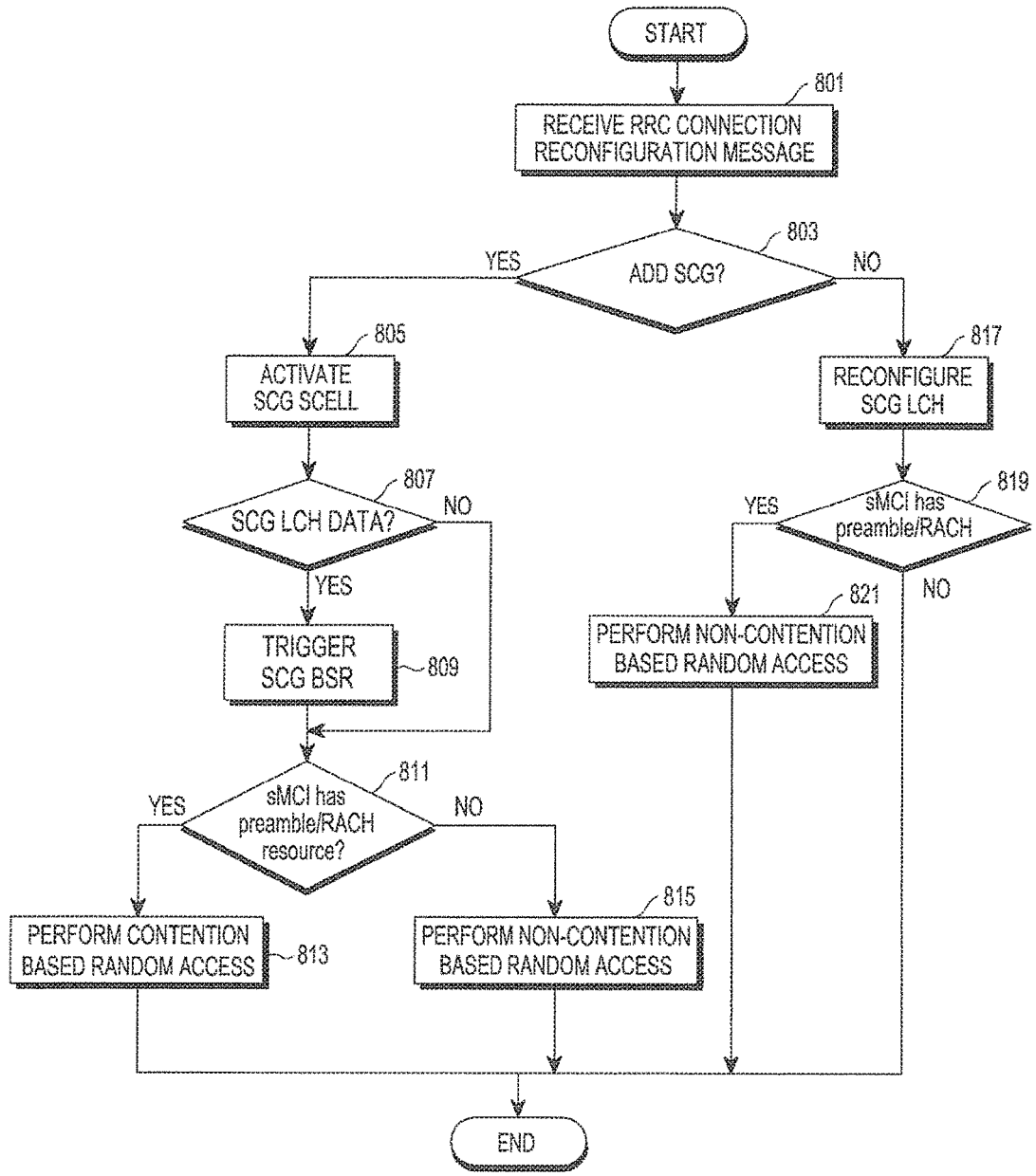
FIG. 8 is a flowchart illustrating a method for performing random access in UE of a mobile communication system, according to another embodiment of the present disclosure.

FIG. 8 is a flowchart illustrating a method for performing random access in UE of a mobile communication system, according to another embodiment of the present disclosure. This embodiment corresponds to the embodiment as discussed with reference to FIG. 6.

Referring to FIG. 8, the UE receives an RRCConnectionReconfiguration message for SCG configuration from a macro eNB, in operation 801. The UE determines whether the received RRCConnectionReconfiguration message is about initial addition of an SCG serving cell, in operation 803. If the message is about the initial addition of an SCG serving cell, the UE activates a pSCell in operation 805, and checks whether there is uplink data on an LCH relocated to the SCG in operation 807. If there is uplink data on the SCG LCH, the UE triggers SCG BSR in operation 809. The UE determines whether an information element like sMCI included in the RRCConnectionReconfiguration message has a preamble and random access radio resources necessary for random access for the SCG in operation 811, and performs non-contention based random access if the information element has them in operation 813. Otherwise, if the preamble or the radio resources for random access are not reserved in the RRCConnectionReconfiguration message, the UE performs contention based random access in operation 815.

On the other hand, if the RRCConnectionReconfiguration message is not about the SCG addition, i.e., the RRCConnectionReconfiguration message has already been received for reconfiguration of SCG serving cells, e.g., uplink control channel resource configuration and pSCell change, in operation 803, the UE changes configuration for the SCG in operation 817. If synchronization of configuration for the SCG is required between the eNB and the UE, the UE determines whether SMCI includes a preamble or radio resources for random access in operation 819. If the SMCI includes the preamble or radio resources for random access, the UE performs random access to the SCG with the resources in operation 821.

The eNB may then confirm that the serving cell configuration has been applied for the UE based on the preamble included in the SMCI.

Figure 9:
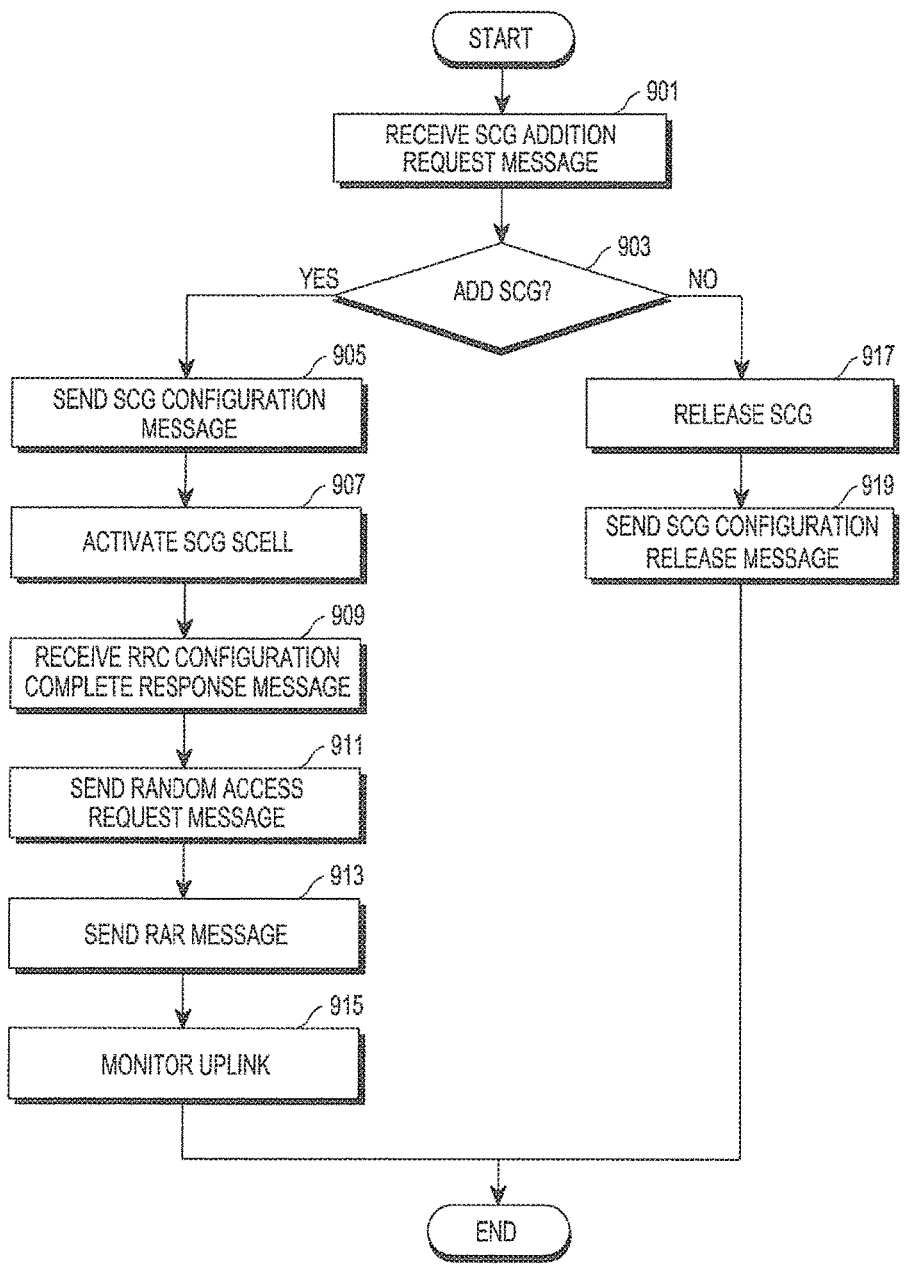
FIG. 9 is a flowchart illustrating a method for performing random access in an SeNB of a mobile communication system, according to an embodiment of the present disclosure.

FIG. 9 is a flowchart illustrating a method for performing random access in an SenB of a mobile communication system, according to an embodiment of the present disclosure.

Referring to FIG. 9, an SeNB receives an SCG addition request message for double connection of a cell of the SeNB from an MeNB, in operation 901. In response to the received SCG addition request message, the SeNB determines whether to do the SCG addition, in operation 903. If determining to do the SCG addition, the SeNB sends the MeNB information about RRC configuration of the SCG that includes the corresponding cell in an SCG configuration message through an X2 interface, in operation 905. After that, the SeNB activates a pSCell and waits until the UE completes configuration for the SCG, in operation 907. At this time, the UE receives the information about SCG configuration from the MeNB in an RRCConnectionReconfiguration message, and in response, sends a RRCConnectionReconfiguration complete message to the MeNB. The MeNB in turn sends the SeNB a response message informing that RRC configuration has been completed.

The SeNB then receives the response message from the MeNB that informs that RRC configuration has been completed for the UE, in operation 909. The SeNB then sends a random access request message for the UE to perform a random access procedure on the PDCCH, in operation 911. After that, the SeNB keeps monitoring the established random access channel, and sends the UE a Random Access Response (RAR) message for allocation of resources for an uplink common control channel, in operation 911. The SeNB then monitors an uplink channel to receive an uplink data transmission, in operation 915.

On the other hand, if the SeNB does not want to do the SCG addition in response to the received SCG addition request message in operation 903, the SeNB determines to release the SCG, in operation 917. The SeNB then sends an SCG configuration release message to the MeNB, in operation 919.

Figure 10:
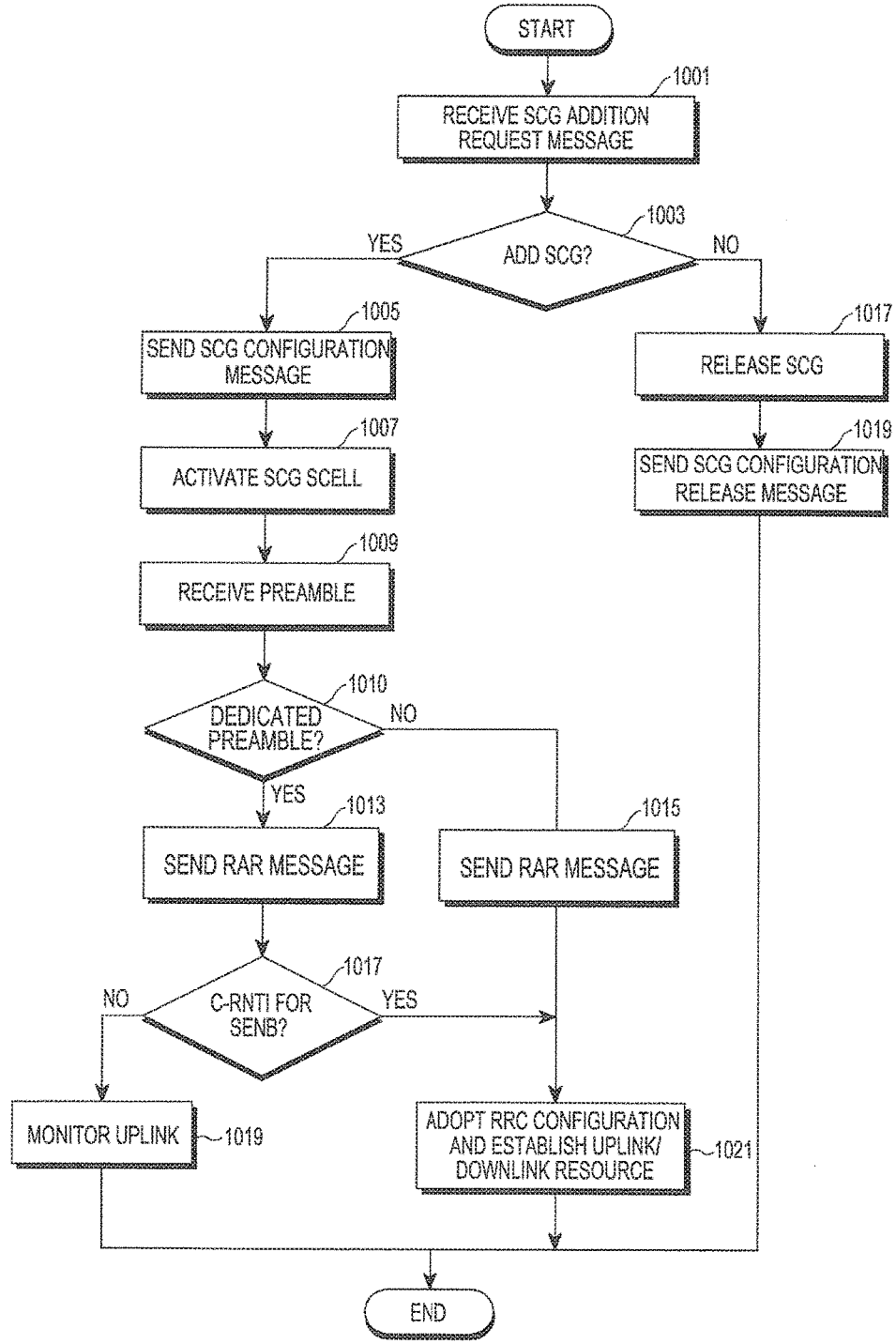
FIG. 10 is a flowchart illustrating a method for performing random access in an SeNB of a mobile communication system, according to another embodiment of the present disclosure.

FIG. 10 is a flowchart illustrating a method for performing a random access procedure in an SeNB of a mobile communication system, according to another embodiment of the present disclosure. For reference, the flowchart of FIG. 10 is equally applied not only to a pSCell addition procedure but also to a procedure of RRC configuration in need of synchronization between the SeNB and the UE as shown in FIG. 6. For example, as for uplink resource change, SeNB security key change, and the like, RRC reconfiguration is performed in the same procedure as the pSCell addition procedure.

Referring to FIG. 10, an SeNB receives an SCG addition request message for double connection of the cell of the SeNB from an MeNB, in operation 1001. In response to the received SCG addition request message, the SeNB determines whether to do the SCG addition, in operation 1003. If determining to do the SCG addition or change the SCG, the SeNB sends RRC configuration content to the MeNB in an RRC configuration message through an X2 interface, in operation 1005. At this time, the SeNB sends mobilityControlInfoSCG to the UE, which includes a dedicated preamble, RACH resources, and C-RNTI, in operation 1005. The dedicated preamble may or may not be included. If the dedicated preamble is not included, a contention based random access procedure is performed.

The SeNB performs a random access procedure and receives preamble information on an uplink random access channel, in operation 1009. The SeNB determines whether the received preamble information corresponds to a dedicated preamble allocated, in operation 1011.

If the received preamble information is not the dedicated preamble allocated, the SeNB puts the uplink channel in sync and sends the UE an RAR message for allocation of resources for an uplink common control channel for collision analysis with C-RNTI, in operation 1013. The SeNB then checks the C-RNTI included in the received message on the allocated common control channel, and determines whether it is allocated by the SeNB for double connection of the UE, in operation 1017.

If the C-RNTI included in the received message is allocated by the SeNB for double connection of the UE, the SeNB takes the UE for one independently connected to the SeNB and operates in the same way as the existing independent eNB operates, in operation 1019. In other words, if the C-RNTI included in the received message is not allocated by the SeNB for double connection of the UE, the SeNB performs uplink monitoring, in operation 1019. On the other hand, if the C-RNTI included in the received message is identical to what is allocated by the SeNB for double connection of the UE, the SeNB adopts the RRC configuration and initiates allocation of uplink/downlink radio resources for the UE, in operation 1021.

In the meantime, if the received preamble information corresponds to a dedicated preamble allocated, i.e., if the preamble information corresponds to a preamble sent to a double connection UE, the SeNB sends an RAR message for timing coordination, in operation 1015. The SeNB then adopts the RRC configuration for the UE, establishes uplink/downlink radio resources, and starts data transmission, in operation 1021.

On the other hand, if the SeNB does not want to do the SCG addition in response to the received SCG addition request message in operation 1003, the SeNB determines to release the SCG, in operation 1023. The SeNB then sends an SCG configuration release message to the MeNB, in operation 1025.

Figure 11:
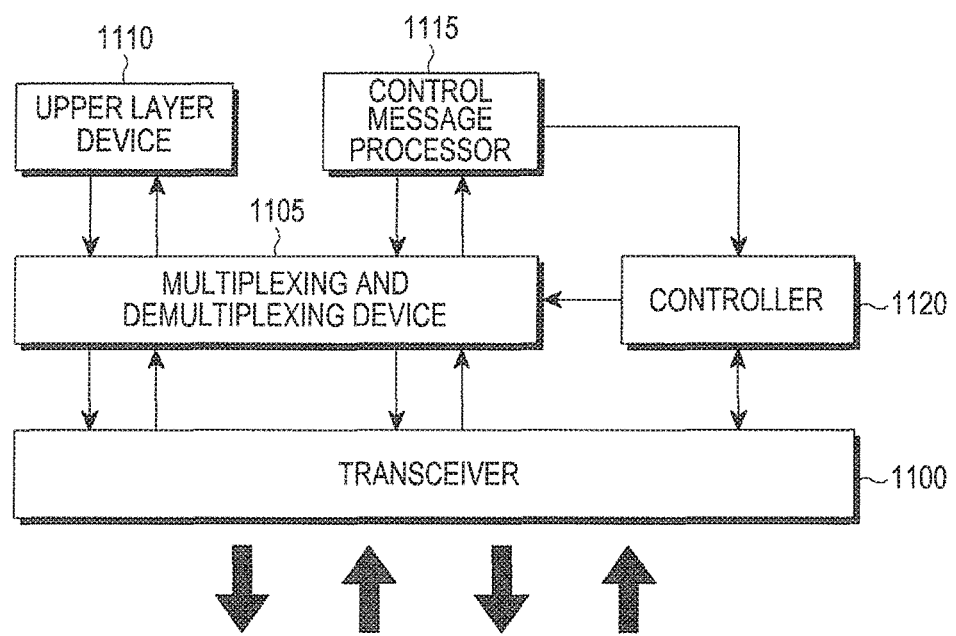
FIG. 11 is a block diagram of an apparatus for performing random access of UE or eNB in a mobile communication system, according to an embodiment of the present disclosure.

FIG. 11 is a block diagram of an apparatus for performing random access of UE or an eNB in a mobile communication system, according to an embodiment of the present disclosure.

UE or an eNB sends/receives data to/from an upper layer 1110 while sending/receiving control messages through a control message processor 1115. In sending a control message or data, the UE or eNB multiplexes the control message or data with a multiplexer 1105 under control of a controller 1120, and then sends the resultant control message or data through a transmitter 1100. On the other hand, in receiving, the UE or eNB receives a physical signal through a receiver 1100 under control of the controller 1120, demultiplexes the received signal with the demultiplexer 1105, and forwards them to the upper layer 1110 or the control message processor 1115 based on respective message information. The controller 1120 performs random access in accordance with the embodiments of the present disclosure as described above, which are described in connection with FIGS. 7 to 10. The description will be omitted herein.

Several embodiments have thus been described, but it will be understood that various modifications can be made without departing the scope of the present disclosure. Thus, it will be apparent to those ordinary skilled in the art that the invention is not limited to the embodiments described, but can encompass not only the appended claims but the equivalents.

What is claimed is:

1. A method by a terminal communicating with a master base station and a secondary base station, the method comprising:
   receiving, from a master base station, a message to change a primary secondary cell (PSCell) of a secondary cell group (SCG) associated with a secondary base station, the message including configuration information related to the SCG;
   changing the PSCell to a new PSCell based on the message;
   identifying whether the configuration information related to the SCG includes mobility control information related to the SCG;
   starting a timer with a timer value included in the mobility control information related to the SCG based on the configuration information including the mobility control information related to the SCG;
   starting to synchronize to a downlink of the new PSCell based on the configuration information including the mobility control information related to the SCG;
   initiating a random access procedure on the new PSCell based on preamble information included in the mobility control information related to the SCG based on the configuration information including the mobility control information related to the SCG; and
   transmitting, to the master base station, a response message in response to the message,
   wherein the timer is stopped in response to the random access procedure being completed successfully.

2. The method of claim 1, wherein initiating the random access procedure comprises performing contention based random access based on no dedicated preamble or radio resource being reserved for the random access in the preamble information.

3. The method of claim 1, wherein initiating the random access procedure comprises performing non-contention based random access based on a dedicated preamble or a radio resource being reserved for the random access in the preamble information.

4. The method of claim 1, wherein the timer value is set by the secondary base station.

5. The method of claim 1, wherein performing the random access procedure comprises,
   sending specific preamble or MAC control element corresponding to SCG C-RNTI to the secondary base station.

6. The method of claim 5, wherein sending specific preamble or MAC control element to the secondary base station is for confirming success of a change to the new PSCell.

7. A method by a master base station communicating with a terminal and a secondary base station, the method comprising:
   transmitting, to a terminal, a message to change a primary secondary cell (PSCell) of a secondary cell group (SCG) associated with a secondary base station, the message including configuration information related to the SCG;
   performing a random access procedure on a new PSCell based on preamble information; and
   wherein a timer, which is started with a timer value included mobility control information related to the SCG being the configuration information including the mobility control information related to the SCG, is stopped in the terminal in response to the random access procedure being completed successfully, and
   wherein the terminal initiates the random access procedure on the new PSCell based on the preamble information included in the mobility control information related to the SCG based on the configuration information including the mobility control information related to the SCG,
   wherein the terminal starts to synchronize to a downlink of the new PSCell based on the configuration information including the mobility control information related to the SCG.

8. The method of claim 7, wherein performing the random access procedure comprises performing contention based random access in response to no dedicated preamble or radio resource being reserved for the random access in the preamble information.

9. The method of claim 7, wherein performing the random access procedure comprises performing non-contention based random access in response to a dedicated preamble or a radio resource being reserved for the random access in the preamble information.

10. A terminal communicating with a master base station and a secondary base station, the terminal comprising:
   a transceiver; and
   a processor coupled with the transceiver and configured to:
      receive, from a master base station, a message to change a primary secondary cell (PSCell) of a secondary cell group (SCG) associated with a secondary base station, the message including configuration information related to the SCG;
      change the PSCell to a new PSCell based on the message,
      identify whether the configuration information related to the SCG includes mobility control information related to the SCG,
      start a timer with a timer value included in the mobility control information related to the SCG based on the configuration information including the mobility control information related to the SCG,
      start synchronizing to a downlink of the new PSCell based on the configuration information including the mobility control information related to the SCG,
      initiate, via the transceiver, a random access procedure on the new PSCell based on preamble information included in the mobility control information related to the SCG based on the configuration information including the mobility control information related to the SCG, and
      transmit, to the master base station, a response message in response to the message,
   wherein the timer is stopped in response to the random access procedure being completed successfully.

11. The terminal of claim 10, wherein the processor is further configured to perform contention based random access in response to no dedicated preamble or radio resource being reserved for the random access in the preamble information.

12. The terminal of claim 10, wherein the processor is further configured to perform non-contention based random access in response to a dedicated preamble or a radio resource being reserved for the random access in the preamble information.

13. A master base station communicating with a terminal and a secondary base station, the master base station comprising:
   a transceiver; and
   a processor coupled with the transceiver and configured to:
      transmit, to a terminal, a message to change a primary secondary cell (PSCell) of a secondary cell group associated with a secondary base station (SCG), the message including configuration information related to the SCG,
      perform, a random access procedure on a new PSCell based on preamble information, and
      receive, from a terminal, a response message in response to the message,
   wherein a timer, which is started with a timer value included in mobility control information related to the SCG based on the configuration information including the mobility control information related to the SCG, is stopped in the terminal in response to the random access procedure being completed successfully, and
   wherein the terminal initiates the random access procedure on the new PSCell based on the preamble information included in the mobility control information related to the SCG based on the configuration information including the mobility control information related to the SCG,
   wherein the terminal starts to synchronize to a downlink of the PSCell based on the configuration information including the mobility control information related to the SCG.

14. The master base station of claim 13, wherein the processor is configured to perform contention based random access in response to no dedicated preamble or radio resource being reserved for the random access in the preamble information.

15. The master base station of claim 13, wherein the processor is configured to perform non-contention based random access in response to a dedicated preamble or a radio resource being reserved for the random access in the preamble information.

* * * * *